(12) United States Patent
Tauber

(10) Patent No.: US 10,270,873 B2
(45) Date of Patent: Apr. 23, 2019

(54) METHOD FOR TRANSMITTING A FUNCTION COMMAND BETWEEN A MOTOR VEHICLE AND A DEVICE OUTSIDE THE VEHICLE, AND INTERFACE APPARATUS AND SYSTEM

(71) Applicant: AUDI AG, Ingolstadt (DE)

(72) Inventor: Matthias Tauber, Creußen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/780,989

(22) PCT Filed: Nov. 17, 2016

(86) PCT No.: PCT/EP2016/077976
§ 371 (c)(1),
(2) Date: Jun. 1, 2018

(87) PCT Pub. No.: WO2017/093032
PCT Pub. Date: Jun. 8, 2017

(65) Prior Publication Data
US 2018/0278706 A1    Sep. 27, 2018

(30) Foreign Application Priority Data

Dec. 3, 2015    (DE) .................. 10 2015 015 627

(51) Int. Cl.
*G06F 8/41*    (2018.01)
*G06F 9/54*    (2006.01)
(Continued)

(52) U.S. Cl.
CPC .............. *H04L 67/28* (2013.01); *G06F 8/42* (2013.01); *G06F 9/54* (2013.01); *G06F 11/00* (2013.01); *H04L 67/12* (2013.01)

(58) Field of Classification Search
None
See application file for complete search history.

(56) References Cited

U.S. PATENT DOCUMENTS 9,365,188 B1 * 6/2016 Penilla ................ B60R 25/2018
9,521,606 B1 * 12/2016 Costa .................... H04L 63/083
(Continued)

FOREIGN PATENT DOCUMENTS

CN    102025771    4/2011
DE    10 2009 018 761 A1    10/2010
(Continued)

OTHER PUBLICATIONS

Translation of International Preliminary Report on Patentability issued Jun. 14, 2018 from International Patent Application No. PCT/EP2016/077976, 5 pages.
(Continued)

*Primary Examiner* — Azizul Choudhury
(74) *Attorney, Agent, or Firm* — Staas & Halsey LLP

(57) ABSTRACT

A function command is transmitted between a motor vehicle and a device outside the vehicle, in which the function command is transmitted via an interface apparatus which is outside the vehicle and provides a communication connection between the motor vehicle and the device. The interface apparatus provides an interface which is used to provide a plurality of valid function commands. The function command is compared with the plurality of valid function commands, and the function command is forwarded only if this function command conforms to the interface, and the function command is transmitted between the motor vehicle and the device only via the interface.

20 Claims, 1 Drawing Sheet

(51) Int. Cl.
    *G06F 11/00*    (2006.01)
    *H04L 29/08*    (2006.01)

(56) References Cited

U.S. PATENT DOCUMENTS

| | | |
|---|---|---|
| 2006/0041337 A1 | 2/2006 | Augsburger et al. |
| 2011/0071734 A1* | 3/2011 | Van Wiemeersch ... G08C 17/02 |
| | | 701/49 |
| 2011/0225260 A1 | 9/2011 | Kalhous et al. |
| 2014/0018129 A1 | 1/2014 | Baldini et al. |

FOREIGN PATENT DOCUMENTS

| | | |
|---|---|---|
| DE | 10 2013 216 055 A1 | 2/2014 |
| DE | 10 2013 104 892 A1 | 11/2014 |
| DE | 10 2015 015 627.6 | 12/2015 |
| WO | PCT/EP2016/077976 | 11/2016 |

OTHER PUBLICATIONS

German Office Action dated Nov. 14, 2016 from German Patent Application No. 10 2015 015 627.6, 10 pages.

International Search Report dated Feb. 10, 2017 from international Patent Application No. PCT/EP2016/077976, 2 pages.

Chinese Office Action dated Nov. 30, 2018 from Chinese Patent Application No. 201680070517.5, with English translation of summary of Examiner's comments, 8 pages.

\* cited by examiner

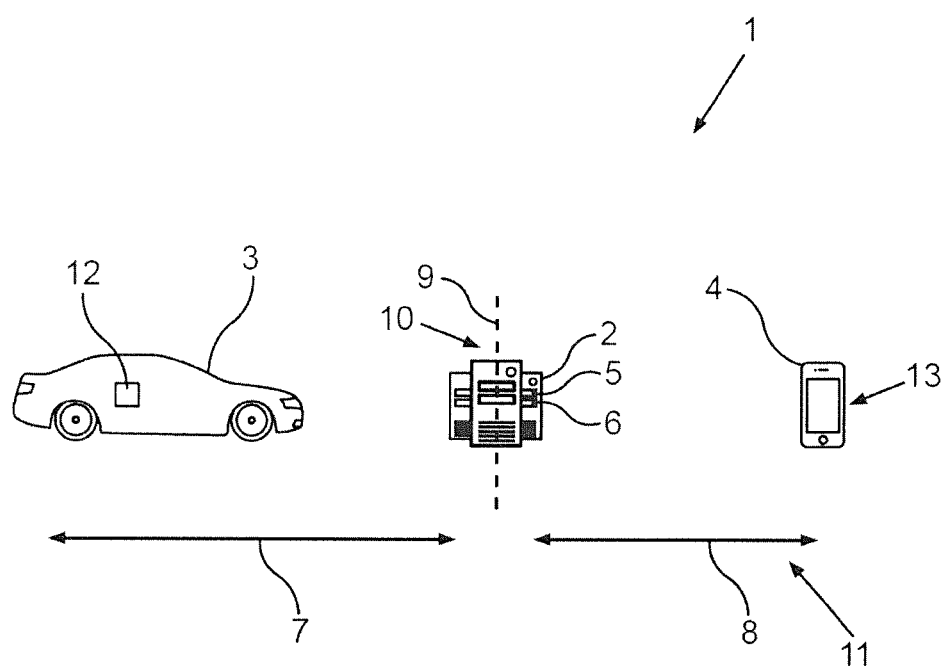

METHOD FOR TRANSMITTING A FUNCTION COMMAND BETWEEN A MOTOR VEHICLE AND A DEVICE OUTSIDE THE VEHICLE, AND INTERFACE APPARATUS AND SYSTEM

CROSS REFERENCE TO RELATED APPLICATIONS

This application is a U.S. national stage of International Application No. PCT/EP2016/077976, filed on Nov. 17, 2016. The International Application claims the priority benefit of German Application No. 10 2015 015 627.6 filed on Dec. 3, 2015. Both the International Application and the German Application are incorporated by reference herein in their entirety.

BACKGROUND

Described herein is a method for transmitting a function command between a motor vehicle and a device outside the vehicle. Also described herein is an interface apparatus and a system with a corresponding interface apparatus.

Methods for transmitting a function command between a motor vehicle and a device outside the vehicle are known. Thus, a function command is issued to the motor vehicle, for example by an application program of the device. A locking of a door of the motor vehicle, for example, is effected on the basis of the function command.

It is furthermore known that a communication of a mobile application program of the device with the motor vehicle normally takes place without interruption from one end point to another end point. The disadvantage here is that a securing and testing of the mobile application program is not therefore possible until all components involved in the communication have been finalized. For the testing of the application program of the device in the development phase, it is normally necessary for the vehicle to be provided as the other end point for this purpose.

German Patent Application Publication 10 2009 018 761 A1 describes a method for updating a software component of a motor vehicle. Vehicle configuration information is determined, including at least the information indicating which hardware components or which software components are present in the specific motor vehicle. A check is carried out on the basis of the vehicle configuration information to determine whether a software component is to be updated. A corresponding updating rule is provided and the software component to be updated is updated on the basis of the updating rule.

A method for the commissioning of a motor vehicle with a plurality of electronic units is known from German Patent Application Publication 10 2013 104 892 A1. The actual data status of the electronic units is read out and compared with a reference data status in a data memory. In the event of discrepancies between the actual data status and the reference data status, the reference data are stored automatically in the electronic unit.

German Patent Application Publication 10 2013 216 055 A1 describes a system which includes a processor of a mobile apparatus. The processor is designed to communicate wirelessly with both a remote server and a vehicle computing system. The processor is furthermore designed to retrieve a module version from the vehicle computing system, to transmit the module version to a remote server and to receive information relating to an updated module version and an updated module. The processor is also designed to retrieve battery information from the vehicle computing system, to inform a user of a battery suitability for a recommended installation of the updated module and to continue the installation and instruct the vehicle computing system to download and install the updated module.

U.S. Patent Application Publication 2014/0018129A1 describes a method for transmitting a function command from a device outside a vehicle to an electronic vehicle component. To do this, an application programming interface (API) is provided which provides a plurality of valid function commands for forwarding to the vehicle component.

U.S. Patent Application Publication 2011/0225260 A1 describes a method for transmitting a function command (e.g. starting and stopping the engine, unlocking the doors, or retrieving the battery status) between a motor vehicle and a device outside the vehicle. The transmission can take place via a portable connection apparatus which provides a communication connection between the vehicle and the device. Function commands of the user are input on the basis of an application-specific connection application which can be stored on the external device and can also be executed there. For this purpose, it loads an apparatus application onto the connection apparatus prior to the transmission of the function commands.

U.S. Patent Application Publication 2011/00717348 A2 describes a method for the remote control of vehicle components by a device outside the vehicle. Function commands are transmitted via an external server which sets up a communication connection between a cell phone and the vehicle. An authentication of the interface is performed in the interface prior to the transmission of function commands to the vehicle. The function commands are normally compared with a plurality of valid function commands for this purpose.

SUMMARY

Described herein is a method, an interface apparatus and a system with which a function command between a motor vehicle and a device outside the vehicle can be checked more simply.

In a method described herein, a function command is transmitted between a motor vehicle and a device outside the vehicle, for example a portable device. The function command is transmitted via an interface apparatus outside the vehicle, for example a stationary interface apparatus, which provides a communication connection between the motor vehicle and the device. An interface by which a plurality of valid function commands are provided is made available by the interface apparatus. The function command is compared with the plurality of valid function commands and is forwarded only if this function command is interface-compliant. The function command is furthermore transmitted between the motor vehicle and the device via the interface only.

An aspect of the method is based on the realization that, in order to check the function command, there is no need for the object respectively situated at the other end of the communication connection, i.e. the motor vehicle or the device, actually to be present in order to develop or test the function command. The interface apparatus is provided for this purpose. The interface apparatus is interposed in the communication connection between the motor vehicle and the device so that the motor vehicle can access the interface apparatus and the device can access the interface apparatus. During the development phase, it is now no longer necessary for the object situated at the other end of the communication connection to be present, since the function command can also be tested merely with the interface apparatus disposed in the communication connection.

The interface, which in turn provides or defines a plurality of valid function commands, is provided by the interface apparatus. This means that a programming interface (API—Application Programming Interface), for example, is provided by the interface. The programming interface or interface for application programming is a program part which is made available by a software system to other programs for connection to the system.

Through the provision of the interface by the interface apparatus, an application program of the device outside the vehicle can now be developed without the motor vehicle, solely through the provision of the interface. An application program of the device outside the vehicle can therefore now be developed, for example, against this interface. The motor vehicle itself which executes the actual function command of the application program is no longer required at the time of the development and the tests associated with the development.

On the other hand, an application program of the motor vehicle can, for example, also be developed against the interface without the device currently being provided. The advantage of the interface apparatus is therefore that a development of application programs which transmit the function command can be carried out independently from the target of the function command. The development of the respective application program can be simplified as a result. However, the compatibility of the function command for further access targets, for example future motor vehicles and/or future devices outside the vehicle, can therefore also be maintained in a simple manner.

An intermediate layer which is the interface between the motor vehicle and an application program of the device outside the vehicle is created by the interface apparatus in a backend or the interface apparatus. The communication connection between the motor vehicle and the device is decoupled and thereby secured by the interface apparatus.

It is provided that the function command can be compared with the plurality of valid function commands of the interface and, in the event of a discrepancy between the function command and any of the valid function commands of the interface, an error of the function command is detected. It is thereby enabled that the function command is developed in an interface-compliant manner. It is furthermore thereby enabled that, if the function command is forwarded beyond the interface apparatus, i.e. to the motor vehicle or to the device, the function command performs the desired function there, for example changes a status of the motor vehicle or the device.

It is furthermore provided that the function command can be directed from the device to the motor vehicle, and a status of a motor vehicle component of the motor vehicle is adapted by the function command. The function command can thus be generated, for example, by an application program of the device and can be directed to the motor vehicle. A vehicle unlocking, for example, can then be carried out by the function command. However, a music exchange, for example, can also be carried out, so that, for example, music is transmitted from the device outside the vehicle to the motor vehicle component of the motor vehicle depending on the function command. The direction of the function command from the device to the motor vehicle becomes simpler and more reliable through the provision of the interface of the interface apparatus.

In a further embodiment, it can be provided that the function command is directed from the motor vehicle to the device and at least one status of a program component of the device is adapted by the function command. Music data, for example, and/or address data can then be transmitted by the function command from the motor vehicle to the device. The function command can in turn be directed more simply and more reliably by the interface of the interface apparatus from the motor vehicle to the device and the status of the program component of the device can be more reliably adapted. The program component may include, for example of an application program of the device or of the operating system of the device.

It can be provided, for example, that the function command is transmitted via the interface between the motor vehicle and the device during a development phase of the function command. It is thus possible, for example, to test the function command against the interface during the development phase. The function command can now be developed without the target intended for the function command, i.e. the motor vehicle or the device, being present. The development of the function command is thereby simplified. Through the provision of the interface, the development of function commands can furthermore be enabled, for example, for a third party who, for example, has only the device, but not the motor vehicle, at his disposal. A plurality of new function commands for the device can thereby be provided in a simple manner.

In a further embodiment, it can be provided that the function command is transmitted via the interface between the motor vehicle and the device during the ongoing operation of the motor vehicle. The transmission of the function command via the interface offers advantages during an ongoing operation also. A checking instance for the function command can thus be provided by the interface apparatus. The compatibility of the function command is then checked by the interface apparatus and, where appropriate, a warning is issued and/or the forwarding of the function command is interrupted if a malfunction of the function command is identified. The function command can be transmitted more reliably during ongoing operation due to the interface of the interface apparatus.

It is furthermore provided that a security signature can be checked in the motor vehicle and/or in the device when the function command is transmitted, and the security signature can also be checked in the interface apparatus. The security during the transmission of the function command is increased by the interface apparatus. It can thus be identified by using the security signature if the function command has been generated or modified by a party not authorized to transmit the function command. A misuse, for example, of the functions provided by the function command can thereby be prevented. The interface apparatus can be operated more securely due to the checking of the safety signature.

Also described herein is an interface apparatus with a processor and a memory unit which is configured to receive a function command from a motor vehicle and/or from a device outside the vehicle, wherein the interface apparatus provides an interface which includes a plurality of valid function commands, wherein the interface apparatus is configured to compare the function command with the plurality of valid function commands and to forward the function command only if this function command is interface-compliant.

The interface apparatus is configured, for example, as a stationary server or as a backend. The backend is what is also referred to as a modular backend building block (MBB).

An interface which provides a plurality of valid function commands is provided by the interface apparatus. The interface is then configured to receive a function command from a motor vehicle or a function command from a device outside the motor vehicle.

The interface apparatus is disposed, for example, outside the motor vehicle and outside the device outside the motor vehicle. The connection from the motor vehicle and/or the device to the interface apparatus is established, for example, wirelessly via a mobile data connection.

Also described herein is a system with a motor vehicle and/or a device outside the vehicle and outside the interface apparatus, for example a portable device, and an interface apparatus.

It is provided that the device can be configured as a mobile terminal device, for example as a Smartphone. However, the mobile terminal device may also be configured, for example, as a tablet computer or any portable computer unit. The mobile terminal device may therefore also be configured, for example, as a Smartwatch.

The example embodiments presented with reference to the method and their advantages apply accordingly to both the interface apparatus described herein and to the system described herein.

Further features of the example embodiments can be found in the claims, the single drawing and the description of the drawing. The features and feature combinations mentioned above in the description, and also the features and feature combinations specified below in the description of the drawing and/or in the drawing alone are usable not only in the respectively indicated combination, but also in other combinations or in isolation without departing the scope of the disclosure. Descriptions which are not explicitly shown and explained in the drawing, but which emerge and are producible from the explained descriptions through separated feature combinations are therefore also encompassed by the disclosure.

BRIEF DESCRIPTION OF THE DRAWING

These and other aspects and advantages will become more apparent and more readily appreciated from the following description of the example embodiments explained in detail below with reference to a schematic drawing. The single drawing shows a schematic illustration of a system according to an example embodiment, with a motor vehicle, a device outside the motor vehicle and an interface apparatus.

DETAILED DESCRIPTION

Reference will now be made in detail to various embodiments, examples of which are described with reference to the accompanying drawing, wherein similar or functionally similar elements are denoted with the same reference characters.

A system 1 is shown schematically in the single drawing. The system 1 may include an interface apparatus 2, a motor vehicle 3 and a device 4.

The interface apparatus 2 is configured, for example, as a server or as a backend. The interface apparatus 2 is also what is referred to as a modular backend building block (MBB). The motor vehicle 3 is configured, for example, as a passenger vehicle. The device 4 is configured, for example, as a Smartphone. The device 4 may include a modular operating system which provides a runtime environment for the execution of mobile application programs. The operating system is configured, for example, as a mobile operating system and may be present, for example, as Android, BlackberryOS, Apple iOS, Windows Phone or as a Linux distribution. For example, a plurality of mobile application programs may be installed on the device 4.

The interface apparatus 2 has a processor 5 and a memory 6. The interface apparatus 2 is therefore present, for example, as a server or as part of a server network or server landscape.

The interface apparatus 2, the motor vehicle 3 and the device 4 are disposed, for example, as spatially separated from one another. A communication connection 7 is set up between the motor vehicle 3 and the interface apparatus 2. A communication connection 8 is set up between the device 4 and the interface apparatus 2. The respective communication connection 7, 8 may include, for example, a wireless connection, for example as a mobile data connection. The IP (Internet protocol) can be used for the respective communication connection 7, 8.

The interface apparatus 2 provides an interface 9. A plurality of valid function commands 10 are provided by the interface 9. The interface 9 is configured, for example, as a programming interface (API). The interface 9 may be configured as a function-oriented programming interface, but may also be configured, for example, as a file-oriented programming interface, object-oriented programming interface or protocol-oriented programming interface. The interface 9 may, however, also be configured as a binary interface (ABI—Application Binary Interface).

A function command 11, for example, is now generated in the device 4. The function command 11 may be generated, for example, by an application program of the device 4. An unlocking of the motor vehicle 3, for example, can be performed by the function command 11. The function command 11 can thus effect, for example, an unlocking or a locking of a lock of the motor vehicle 3. The function command 11 can furthermore effect, for example, a navigation update of the motor vehicle 3, an update of a configuration setting of a control unit of the motor vehicle 3, an air conditioning of the motor vehicle 3 before the start of a journey, an auxiliary heating function of the motor vehicle 3, a light control of the motor vehicle 3, a piloted parking of the motor vehicle 3, a battery charging of the motor vehicle 3, a speed warning of the motor vehicle 3, a vehicle search, a journey log entry, a refueling log entry, a breakdown and accident assistant function, a payment function and/or an access to a social network.

A theft warning, for example, a flashing of the motor vehicle 3, a sounding of the horn of the motor vehicle 3 or a battery status output of the motor vehicle 3 can also be effected by the function command 11.

The function command 11 generated by the device 4 is transmitted from the device 4 to the interface apparatus 2. The transmission takes place via the communication connection 8 between the device 4 and the interface apparatus 2. The function command 11 is compared in the interface apparatus 2 with the plurality of valid function commands 10. On the basis of the comparison, it is determined whether the function command 11 is interface-compliant. A check is therefore carried out to ascertain whether program components of the function command 11 meet the specifications prescribed by the interface 9. If the program component of the function command 11 meets the specifications prescribed by the interface 9, the function command 11 can be assumed to be interface-compliant.

The function command 11 can be transmitted to the interface apparatus 2 either during a development phase of the function command 11 in which the function command 11 is then forwarded only as a function command 11 checked for interface compliance within the interface apparatus 2 or to the device 4. It is therefore not necessary for the function command 11 to be forwarded to the motor vehicle 3 during the development phase.

During the ongoing operation of the motor vehicle 3, the function command 11 can then be forwarded initially from the interface apparatus 2 to the motor vehicle 3 on completion of the interface compliance check. A status of a motor vehicle component 12 of the motor vehicle 3 is then adapted there, for example depending on the function command 11. The motor vehicle component 12 can thus be configured as a lock, actuator, control unit, display unit or data memory.

Additionally or alternatively, however, the function command 11 can also be generated in the motor vehicle 3. The function command 11 generated in the motor vehicle 3 is then transmitted, for example, from the motor vehicle 3 via the communication connection 7 to the interface apparatus 2. The function command 11 is then compared there once more with the plurality of valid function commands 10 in order to check the interface compliance of the function command 11. If this interface compliance of the function command 11 then exists, the forwarding to the device 4 can be foregone as in the case of the previously described method during the development phase, and instead the forwarding can take place within the interface apparatus 2 or back to the motor vehicle 3 in order to report a result of the interface compliance test of the function command 11.

In the ongoing operation of the motor vehicle 3, the function command 11 is forwarded to the device 4 from the interface apparatus 2 in order to adapt a status of a programming component 13 of the device 4 there. A music database, for example, a navigation database, an access to a social network, an address database or any status of the device 4 can be adapted by the programming component 13.

Both development operations, both of function commands 11 which are generated in the motor vehicle 3 and of function commands 11 which are generated in the device 4, are therefore decoupled through the provision of the interface 9 of the interface apparatus 2. The motor vehicle 3 is thus to be secured only in relation to the interface apparatus 2 and the device 4 is similarly to be secured only in relation to the interface apparatus 2. Only the motor vehicle 3 in conjunction with the interface apparatus 2 or the device 4 in conjunction with the interface apparatus 2 is required for the development of the function command 11.

Further advantages of the interface 9 are, for example, that a greater robustness of the function command 11 can thereby be achieved. Errors in the implementation of the function command 11, for example, can thus be detected early through the transmission of the function command 11 against the interface 9. An error-free transmission of the function command 11, for example, can additionally be detected via the respective communication connection 7, 8.

A plurality of interfaces 9, for example for different vehicle classes of motor vehicles, can furthermore be provided so that the interface 9 functionally allocated to an individual vehicle class can be provided in each case by the interface apparatus 2.

The system also includes permanent or removable storage, such as magnetic and optical discs, RAM, ROM, etc. on which processes and data structures can be stored and distributed. The processes can also be distributed via, for example, downloading over a network such as the Internet. The system can output the results to a display device, printer, readily accessible memory or another computer on a network.

A description has been provided with reference to example embodiments, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for transmitting a function command between a motor vehicle and a device disposed outside the motor vehicle via an interface apparatus configured as a stationary server and disposed outside the motor vehicle and outside the device, the method comprising:
    providing, by the interface apparatus, a communication connection between the motor vehicle and the device;
    providing, by the interface apparatus, an interface which comprises a plurality of valid function commands, the interface configured as an application programming interface (API), or as a function-oriented programming interface, or as a file-oriented programming interface, or as an object-oriented programming interface, or as a protocol-oriented programming interface, or as an application binary interface (ABI);
    receiving, by the interface of the interface apparatus only, the function command from one of the motor vehicle and the device to be selectively forwarded to the other one of the motor vehicle and the device by the interface apparatus;
    comparing, by the interface apparatus, the function command with the plurality of valid function commands;
    determining, by the interface apparatus, whether the function command is interface-compliant based on the comparing; and
    forwarding, to the other one of the motor vehicle and the device by the interface apparatus, the function command only if the determining determines the function command is interface-compliant.

2. The method as claimed in claim 1, further comprising detecting an error of the function command when a discrepancy between the function command and any of the plurality of valid function commands exists, based on the comparing.

3. The method as claimed in claim 1, wherein
    the interface receives the function command from the device, and
    the function command is to be selectively forwarded to the motor vehicle by the interface apparatus for changing a status of a motor vehicle component of the motor vehicle.

4. The method as claimed in claim 1, wherein
    the interface receives the function command from the motor vehicle, and
    the function command is to be selectively forwarded to the device by the interface apparatus for changing a status of a program component of the device.

5. The method as claimed in claim 1, wherein the function command is received by the interface from one of the motor vehicle and the device during a development phase of the function command.

6. The method as claimed in claim 1, wherein the function command is received by the interface from one of the motor vehicle and the device during an ongoing operation of the motor vehicle.

7. The method as claimed in claim 1, further comprising:
    checking a security signature by the one of the motor vehicle and the device when the function command is transmitted to the interface apparatus by the one of the motor vehicle and the device; and checking the security signature by the interface apparatus when the function command is received by the interface of the interface apparatus.

8. An interface apparatus configured as a stationary server, the interface apparatus, comprising:
   a memory configured to store a function command received from one of a motor vehicle and a device disposed outside the motor vehicle, the interface apparatus being disposed outside of the motor vehicle and the device;
   an interface to receive the function command from the one of the motor vehicle and the device, the interface configured as an application programming interface (API), or as a function-oriented programming interface, or as a file-oriented programming interface, or as an object-oriented programming interface, or as a protocol-oriented programming interface, or as an application binary interface (ABI), and the interface comprising a plurality of valid function commands; and
   a processor to compare the function command with the plurality of valid function commands, to determine based on the comparison whether the function command is interface-compliant, and to forward the function command to the other one of the motor vehicle and the device only if the function command is determined to be interface-compliant.

9. The interface apparatus as claimed in claim 8, wherein
   when the interface receives the function command from the device, the processor selectively forwards the function command to the motor vehicle for changing a status of a motor vehicle component of the motor vehicle, and
   when the interface receives the function command from the motor vehicle, the processor selectively forwards the function command to the device for changing a status of a program component of the device.

10. The interface apparatus as claimed in claim 9, wherein
    the motor vehicle component of the motor vehicle includes at least one of a lock, an actuator, a control unit, a display unit, and a data memory, and
    the program component of the device includes at least one of an application program of the device and an operating system of the device.

11. The interface apparatus as claimed in claim 8, wherein the interface apparatus comprises a plurality of interfaces, each interface among the plurality of interfaces corresponding to an individual vehicle class of motor vehicles.

12. The interface apparatus as claimed in claim 8, wherein the interface apparatus is configured to communicate with the motor vehicle and the device over a wireless network.

13. The interface apparatus as claimed in claim 8, wherein
    when the interface apparatus receives the function command from the one of the motor vehicle and the device during a development phase of the function command, the processor is configured to not forward the function command to the other one of the motor vehicle and the device if the function command is determined to be interface-compliant, and
    when the interface apparatus receives the function command from the one of the motor vehicle and the device during an ongoing operation of the motor vehicle, the processor is configured to forward the function command to the other one of the motor vehicle and the device only if the function command is determined to be interface-compliant.

14. A system, comprising:
    at least one of a motor vehicle and a device disposed outside the motor vehicle; and
    an interface apparatus configured as a stationary server and disposed outside of the motor vehicle and the device, the interface apparatus comprising:
      a memory configured to store a function command received from one of the motor vehicle and the device,
      an interface to receive the function command from the one of the motor vehicle and the device, the interface configured as an application programming interface (API), or as a function-oriented programming interface, or as a file-oriented programming interface, or as an object-oriented programming interface, or as a protocol-oriented programming interface, or as an application binary interface (ABI), and the interface comprising a plurality of valid function commands, and
      a processor to compare the function command with the plurality of valid function commands, to determine based on the comparison whether the function command is interface-compliant, and to forward the function command to the other one of the motor vehicle and the device only if the function command is determined to be interface-compliant.

15. The system as claimed in claim 14, wherein the device is configured as a mobile terminal device.

16. The system as claimed in claim 14, wherein the device is configured as a Smartphone.

17. The system as claimed in claim 14, wherein
    wherein the interface apparatus is configured to communicate with the motor vehicle and the device over a wireless network,
    when the interface receives the function command from the device, the processor selectively forwards the function command to the motor vehicle for changing a status of a motor vehicle component of the motor vehicle, and
    when the interface receives the function command from the motor vehicle, the processor selectively forwards the function command to the device for changing a status of a program component of the device.

18. The system as claimed in claim 14, wherein
    the motor vehicle component of the motor vehicle includes at least one of a lock, an actuator, a control unit, a display unit, and a data memory, and
    the program component of the device includes at least one of an application program of the device and an operating system of the device.

19. The system as claimed in claim 14, wherein the interface apparatus comprises a plurality of interfaces, each interface among the plurality of interfaces corresponding to an individual vehicle class of motor vehicles.

20. The system as claimed in claim 14, wherein
    when the interface apparatus receives the function command from the one of the motor vehicle and the device during a development phase of the function command, the processor is configured to not forward the function command to the other one of the motor vehicle and the device if the function command is determined to be interface-compliant, and
    when the interface apparatus receives the function command from the one of the motor vehicle and the device during an ongoing operation of the motor vehicle, the processor is configured to forward the function command to the other one of the motor vehicle and the device only if the function command is determined to be interface-compliant.

* * * * *

UNITED STATES PATENT AND TRADEMARK OFFICE
CERTIFICATE OF CORRECTION

PATENT NO. : 10,270,873 B2
APPLICATION NO. : 15/780989
DATED : April 23, 2019
INVENTOR(S) : Matthias Tauber Page 1 of 1

It is certified that error appears in the above-identified patent and that said Letters Patent is hereby corrected as shown below:

Column 10, Line 33:
In Claim 17, delete "wherein"

Signed and Sealed this
Sixteenth Day of July, 2019

Andrei Iancu
*Director of the United States Patent and Trademark Office*